US006087017A

United States Patent [19]
Bibber

[11] Patent Number: 6,087,017
[45] Date of Patent: Jul. 11, 2000

[54] CORROSION RESISTANT COATING FOR ALUMINUM AND ALUMINUM ALLOYS

[75] Inventor: John W. Bibber, Batavia, Ill.

[73] Assignee: Sachem, Inc., Chicago, Ill.

[21] Appl. No.: 09/097,617

[22] Filed: Jun. 15, 1998

[51] Int. Cl.[7] .......................... B32B 15/08; B32B 15/20; B32B 27/36; C09K 15/06
[52] U.S. Cl. .................. 428/458; 428/457; 428/650; 428/658; 428/467; 428/484; 106/13; 106/14.13; 106/14.34
[58] Field of Search ..................... 428/650, 658, 428/457, 458, 467, 484, 480; 106/13, 14.13, 14.34, 14.35, 14.41; 524/277, 487, 490, 514, 488; 528/271, 295.5; 525/437

[56] References Cited

U.S. PATENT DOCUMENTS

| | | | |
|---|---|---|---|
| 3,632,402 | 1/1972 | Weissermel | 117/100 C |
| 3,714,090 | 1/1973 | Lasher | 260/21 |
| 3,714,091 | 1/1973 | Lasher | 260/21 |
| 3,853,665 | 12/1974 | Gardziella | 156/332 |
| 4,181,638 | 1/1980 | Lasher | 260/22 R |
| 4,368,316 | 1/1983 | Laddha et al. | 528/295.5 |
| 4,483,969 | 11/1984 | Joyner et al. | 525/437 |
| 4,487,919 | 12/1984 | Trotter et al. | 528/272 |
| 4,554,303 | 11/1985 | Petke et al. | 524/277 |
| 4,640,938 | 2/1987 | Romer et al. | 522/79 |
| 4,725,661 | 2/1988 | Miyabayashi | 528/45 |
| 4,783,497 | 11/1988 | Thompson | 524/391 |
| 4,873,281 | 10/1989 | Maska | 524/457 |
| 5,223,562 | 6/1993 | Sagawa et al. | 524/275 |

*Primary Examiner*—Deborah Jones
*Assistant Examiner*—Michael LaVilla
*Attorney, Agent, or Firm*—Roberts F. I. Conte; Lee, Mann, Smith, McWilliams, Sweeney & Ohlson

[57] ABSTRACT

I provide an outer anti-corrosion aluminum or aluminum alloy protective coating composition. The composition may be applied directly to the aluminum or aluminum alloy or to an anodized form thereof or to an anodized or non-anodized aluminum or aluminum article which has a non-chromium conversion coating therein. The outer protective coating composition contains as essential ingredients an aqueous emulsion of a polybasic acid, a polyol and a lanolin wax acid which react in-situ on the article. Also, I provide the aluminum or aluminum alloy article having thereon an outer layer of an anti-corrosive lanolin wax polyester coating and a method of forming an anti-corrosion layer on the outer surface of the article.

19 Claims, No Drawings

CORROSION RESISTANT COATING FOR ALUMINUM AND ALUMINUM ALLOYS

FIELD OF THE INVENTION

The present invention relates to a non-chromium corrosion resistant coating for aluminum and aluminum alloys which is a wax polyester. More particularly the present invention relates to a composition and method of coating an aluminum or aluminum alloy with a non-chromium corrosion resistant composition having therein a lanolin wax acid that forms in-situ on the aluminum or aluminum alloy or conversion coated aluminum or aluminum alloy surface a lanolin wax polyester coating.

BACKGROUND OF THE INVENTION

The chemical conversion coating of aluminum, and its alloys, is known in the art as a process whereby the surface of the metal is chemically converted to a surface that more easily accepts applied coatings, i.e. paint, and increases the corrosion resistance of the metal. The corrosion resistance aspect of the art is of particular importance in the aircraft industry as they frequently employ aluminum alloys that are easily corroded.

An accepted process involves the use of chromates and or dichromates to produce a surface coating of acid based chromium. As these are rather toxic, and have a considerable environmental concern, the chromate based conversion coatings are being displaced by less toxic materials. Alternative conversion coatings which can be used are based on potassium permanganate and zirconium compounds, either by themselves or incorporated in a polymer system.

The general disadvantage of using a polyester coating as a coating for the aluminum and aluminum alloy surfaces is that the polyesters are generally easily hydrolyzed and/or broken down in wet humid environments.

SUMMARY OF THE INVENTION

This invention is directed towards the corrosion resistant characteristics of a wax polyester film formed in-situ on the aluminum and aluminum alloy which is used independently and/or incorporates or covers a non-chromium existing conversion coating such as permanganate and zirconium. The preferred coating is water based and as a result generates no volatile organic carbon compounds. In addition, it does not contain any known toxic substances. The coating is very thin and due to its thinness is sufficiently electrically conductive for use in aerospace applications. The term aluminum alloy also covers what some may call a zinc alloy. That is, an alloy having at least 3.0% aluminum and more than 90% zinc.

It is an object of this invention to provide an aqueous aluminum coating composition to provide an outer protective coating for an anodized or non-anodized aluminum or aluminum alloy which may also have a conversion coating thereon. The protective coating has the essential ingredients thereof a polybasic acid, a polyol, and a lanolin wax acid to form in-situ with the polybasic acid, polyol and lanolin wax acid, a lanolin wax polyester.

It is a further object of this invention to provide an anodized or non-anodized aluminum or aluminum alloy article which may have thereon a conversion coating, an outer protective coating of a lanolin wax polyester formed from the in-situ reaction of an aqueous aluminum coating composition having as the essential ingredients thereof a polybasic acid, a polyol, and a lanolin wax acid.

It is still a further object of this invention to provide a process of treating an anodized or non-anodized aluminum or aluminum alloy substrate which may have a conversion coating for corrosion resistance, by coating said substrate with a film of a water-based emulsion of a polybasic acid and a polyol and a lanolin wax acid, heating the coated substrates to a temperature of at least 200° F. for a sufficient time to form a lanolin wax polyester outer protective coating on said substrate.

DETAILED DESCRIPTION OF THE INVENTION

An anodized or non-anodized aluminum or aluminum alloy is afforded corrosion resistance by having thereon an outer protective coating of a lanolin wax polyester. The aluminum or aluminum alloy may have thereon an intermediate conversion coating.

As noted above, the aluminum alloys having at least 3% by weight aluminum and more than 90% by weight zinc are also part of this invention. The preferred aluminum alloys are those containing at least 80% by weight Al and the Al—Zn alloys containing by weight at least 3% Al and preferably 3–7% Al and 93–97% Zn. The Al—Zn alloys which are protected by my protective coating are the Zamak cast alloys by Bryan Die Cast Products, Inc. of Bryan, Ohio, which contain at least 3% by weight Al.

My protective coating does require the article to have aluminum as part of the composition.

The aluminum alloy substrate is chosen so that my protective lanolin wax polyester protective coating formed in-situ using a lanolin wax acid will provide a lanolin wax polyester protective coating that will show no signs of corrosion when subjected to a salt fog at 95° F., according to ASTM method B-117 for at least 100 hrs. will show no signs of corrosion and only minor signs of corrosion when subjected for 168 hrs.

The lanolin wax polyesters are formed by the reaction of an aqueous emulsion of a polybasic acid, a polyol with two or more alcohol or OH groups, and a lanolin wax acid. Heat is required to form the lanolin wax polyester polymer. To aid the reaction, the emulsion may contain cross-linking agents, such as amino resins, to increase the rate of reaction or lower the required reaction temperature. I have added to the normal mixture of polyols and polybasic acids that form polyesters, a lanolin wax acid that is dispersible in water to give a softer more elastic, and corrosion resistant wax polyester product. The composition utilized to form the lanolin wax polyester is an aqueous emulsion of 0.5 to 20 parts by weight polybasic acid or anhydride 0.5 to 3.0 parts by weight polyol 0.1 to 3.0 parts by weight lanolin wax acid having an overall acid number of 100 to 160.

The polybasic acid or anhydride is preferably a $C_8$–$C_{25}$ compound. A widely used organic polybasic acid for forming polyesters is the trimellitic acid also known as 1,2,4 benzenetricarboxylic acid or anhydride. This is generally sold and used as the anhydride because the dry form of the acid will revert to the anhydride. The material is relatively low in cost, rather reactive and has a low melting point. Other useful polybasic acids and their anhydrides are isophthalic acid and synthetic polyethylene acrylic acid copolymers. In general, most polybasic organic acids may be used.

The polyol is preferably a $C_4$–$C_{10}$ polyol. The most preferred polyols are: dipropylene glycol, triethylene glycol, diethylene glycol, hydrogenated bisphenol, and 1,4 cyclohexanedimethanol. In general, most any polyol may be used.

The lanolin wax acid is a complex mixture containing various acids and alcohols and is rich in high molecular weight, straight-chain and branched chain acids and alcohols. The lanolin wax acid of this invention has an overall acid number of 100 to 160 and preferably from 125–135; and an overall hydroxyl number of 30 to 100 and preferably from 65–90. An appropriate lanolin wax acid that can be used and which is used in the examples is NATRALUBE 210 purchased from The Fanning Corporation, Chicago, Ill. This is a solid form. This has an overall acid number of 125–135, a saponification number of 140–160, a hydroxyl number of 65–90, a maximum iodine number of 10 and a softening point of 50–60° C. Also this is insoluble in water and generally requires an emulsifying agent to keep it dispersed in water. Another lanolin wax acid that can be used is Amerlate LFA sold by Amerchol, a unit of CPC International, Inc., Edison, N.J., has an acid value of 125–150, hydroxyl value of 40–60, a saponification value of 155–175, a melting range of 55–62° C., and iodine value of 10 max.

The aqueous emulsion composition generally contains 75 to 96% water and is such that when it is coated on the surface of the aluminum or aluminum alloy it forms a thin film. The coating may be applied by any suitable means such as immersion, brushing, or spraying the emulsion on the aluminum or aluminum alloy surface or the surface of a non-chromium conversion coated aluminum or aluminum alloy substrate. The thin emulsion film is then heated to a temperature of greater than 200° F. for a sufficient time to cause the polybasic acid or anhydride, polyol and lanolin wax acid to react and at least partially cross-link with each other to form the lanolin wax polyester.

The advantages gained by using my lanolin wax polyester as an outer seal coating application are that the formed polyester has many highly polar polyester groups that provide good adhesion to the anodized or non-anodized aluminum or aluminum alloy surfaces and provide adhesion to any non-chromium intermediate conversion coatings thereon such as permanganate and zirconium.

The lanolin wax polyester is rich in polar ester and unreacted acid and alcohol groups and at the same time has a great deal of resistance to hydrolysis. This gives corrosion resistance and adherence to metal surfaces at the same time. The following examples illustrate the processes for bringing this about. As noted above, polyesters in general are easily hydrolyzed or broken down in wet humid environments. Generally, those made resistant to hydrolysis result in a decrease in polymer adhesion to the aluminum or aluminum alloy surfaces.

The various types of permanganate conversion coating are shown in my U.S. Pat. Nos. 4,711,667, 4,755,224, 4,878,963, 4,895,608, 4,988,396, 5,358,623, 5,437,740, 5,554,231, 5,707,465, and these patents are incorporated herein.

The zirconium conversion coating for aluminum alloys is shown in U.S. Pat. No. 4,191,596 and this patent is incorporated herein.

The aluminum alloy used in the following examples is the "2024-T3" alloy because this alloy represents an extreme example of corrosion susceptibility. If a composition can provide corrosion protection for this alloy it is generally considered as being able to provide protection for any aluminum or aluminum alloy. On average, the 2024-T3 alloy contains: 4.4% copper, 0.6% manganese, 1.5% magnesium, 2.0% nickel, and 91.5% aluminum.

Examples 1 and 2 show that without the lanolin wax acid, the formed polyester does not adequately protect the aluminum alloy.

In all examples percentages are percentages by weight.

EXAMPLE 1

A three inch by ten inch panel of "2024-T3" aluminum alloy was cleaned in mildly alkaline cleaner at 150–160° F. for 3 minutes, rinsed in deionized water and deoxidized in a solution of 10% nitric acid and 3% sodium bromate at 120° F. for five minutes. The panel. was then rinsed in deionized water and dried. The cleaned panel was then immersed in with the following water based emulsion at room temperature for less than 1 minute. The water based emulsion was 2.5% dipropylene glycol;

2.2% trimellitic anhydride;

2.5% of an equal molar mixture of linseed fatty acids, oleic fatty acids, stearic fatty acid and tung oil acids;

0.80% 2-amino-2-methyl-1-propanol; and 92.0% mixture of water and enough ammonia to reach a pH of 9.0–9.5.

The panel was removed from the emulsion and allowed to dry at room temperature for about 10 minutes. Then the dried coated panel was placed in a heat chamber which was at a temperature of 275–300° F. The panel remained in the heat chamber for about 15 minutes. The panel was removed and had thereon a thin polyester coating. The panel was allowed to cool. The cooled panel was then placed in a salt fog at 95° F. according to ASTM method B-117.

After 24 hours of exposure to this salt fog, the panel showed extensive signs of corrosion.

EXAMPLE 2

A three inch by ten inch panel of 2024-T3 aluminum alloy was cleaned according to Example 1. The procedure of Example 1 was followed, except that after being immersed and dried, the dried coated panel was placed in a heat chamber which was at a temperature of 450–475° F. to more completely form the polyester and incorporate the fatty acids. The panel remained in the heat chamber for about 15 minutes. The panel was removed and had thereon a thin polyester coating. The polyester coated panel was allowed to cool. The cooled panel was then placed in a salt fog at 95° F. according to ASTM method B-117. After 24 hours exposure to this salt fog the panel showed substantial signs of corrosion.

EXAMPLE 3

A three inch by ten inch panel of 2024-T3 aluminum alloy was cleaned according to Example 1. The panel was then immersed in the following water based emulsion:

2.5% Dipropylene glycol;

2.2% trimellitic anhydride;

2.5% of Natralube 210, 0.56% 2-Amino-2-Methyl-1-propanol (emulsification agent); and 92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the panel showed only minor signs of corrosion.

EXAMPLE 4

A three inch by ten inch panel of 2024-T3 aluminum alloy was cleaned according to Example 1. The panel was then immersed in the following water based emulsion:

- 2.5% Dipropylene glycol;
- 3.0% isophthalic acid;
- 2.5% of Natralube 210;
- 0.56% 2-Amino-2-Methyl-1-propanol (emulsification agent); and
- 91.44% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the panel showed only minor signs of corrosion.

EXAMPLE 5

A three inch by ten inch panel of 2024-T3 aluminum alloy was cleaned according to Example 1. The panel was then immersed in the following water based emulsion:

- 3.0% 1,4-cyclohexanedimethanol;
- 2.2% trimellitic anhydride;
- 2.5% Natralube 210;
- 0.56% 2-Amino-2-Methyl-1-propanol (emulsification agent); and
- 91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the panel showed only minor signs of corrosion.

EXAMPLE 6

A three inch by ten inch panel of 2024-T3 aluminum alloy was cleaned according to Example 1. The Panel was then immersed in the following water based emulsion:

- 2.5% Dipropylene glycol;
- 2.2% trimellitic anhydride;
- 2.5% Natralube 210
- 0.56% 2-Amino-2-Methyl-1-propanol (emulsification agent); and
- 91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 450–475° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the panel showed only minor signs of corrosion.

EXAMPLE 7

A 3×10 inch panel of 2024-T3 aluminum alloy was cleaned in a mild alkaline cleaner at 150–160° F. for 3 minutes, rinsed in deionized water and deoxidized in a solution of 10% nitric acid and 3% sodium bromate at 120° F. for 5 minutes. The panel was then rinsed in deionized water. The cleaned aluminum alloy panel was immersed for about 1 minute at about 150° F. in a aqueous solution of 0.3% potassium permanganate and 0.01% lithium nitrate, to form a permanganate conversion coating on the panel. The permanganate conversion coated panel was removed from the solution, rinsed with warm water and dried.

The coated panel was then immersed in the following water based emulsion:

- 2.5% Dipropylene glycol;
- 2.2% trimellitic anhydride;
- 2.5% Natralube 210,
- 0.56% 2-Amino-2-Methyl-1-propanol (emulsification agent); and
- 92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 336 hours of exposure to this salt fog, the lanolin polyester coated panel showed no signs of pitting.

EXAMPLE 8

The procedure of Example 7 was followed to form a permanganate conversion coating on the 2024-T3 aluminum alloy panel with the aqueous solution of 0.3% potassium permanganate and 0.01% lithium nitrate. The permanganate coated panel was then immersed in the following water based emulsion:

- 3.0% 1,4 cyclohexanedimethanol;
- 2.2% trimellitic anhydride;
- 2.5% Natralube 120;
- 0.56% 2-Amino-2-Methyl-1-propanol (emulsification agent); and
- 91.74% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 336 hours of exposure to this salt fog, the panel showed no signs of pitting.

EXAMPLE 9

A 3×10 inch panel of 2024-T3 aluminum alloy was cleaned and deoxidized according to Example 7. The cleaned aluminum panel was immersed for less than 1 minute in a solution of:

4.11 g/l of Acryol TT935 from Rohm & Haas which is a polyacrylic acid.
 1.23 g/l of $H_2ZrF_6$
 pH is 2.1

The coated panel was air dried and then baked at 190° F. for about 5 minutes. The zirconium conversion coated panel was cooled and then immersed in the following water based emulsion:

2.5% Dipropylene glycol;
 2.2% trimellitic anhydride;
 2.5% Natralube 120,
 0.56% 2-Amino-2-Methyl-1-propanol (emulsification agent); and
 92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the lanolin polyester coated panel showed minor signs of pitting.

EXAMPLE 10

A 3×10 inch 2024-T3 aluminum alloy panel was cleaned according to Example 1. The cleaned panel was anodized in a solution of 4% sulfuric acid and 1.0% boric acid at 80° F. for about 20 minutes. The voltage was 15 volts and the current density was about 10 amps per square foot.

The anodized panel was then immersed in the following water based emulsion:

2.5% Dipropylene glycol;
 2.2% trimellitic anhydride;
 2.5% Natralube 210;
 0.56% 2-Amino-2-Methyl-1-propanol (emulsification agent); and
 92.24% mixture of water and enough ammonia to reach a pH of 9.0–9.5.

After approximately 1 minute, the coated anodized panel was removed from the emulsion and allowed to dry at room temperature for about 30 minutes. The dried coated anodized panel was then placed in a heat chamber which was at a temperature of 275–300° F. The panel remained in the heat chamber for about 15 minutes. The panel was removed and had thereon a thin lanolin polyester coating. The lanolin polyester coated anodized panel was allowed to cool. The cooled panel was then placed in a salt fog at 95° F. according to ASTM method B-117. After 168 hours of exposure to this salt fog, the panel showed only minor signs of corrosion.

EXAMPLE 12

A 3×10 inch panel of 2024-T3 aluminum alloy was cleaned according to Example 7. The panel was then immersed in the following water based emulsion:

10% acrylic acid—polyethylene polymer (AC-5120 sold by Allied Signal Corp.)
 1.0% Dipropylene glycol,
 0.1% of Natralube 210,
 0.3% 2-Amino-2-Methyl-1-propanol (emulsification agent); and
 2.5% light mineral oil (as plasticizer),
 86.1% mixture of water and enough ammonia to reach a pH of 9.0–9.5.

The water is added to the melted base mixture at boiling point to form the emulsion. After being immersed for approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 168 hours of exposure to this salt fog, the panel showed only minor signs of corrosion.

EXAMPLE 13

A panel of Zamak #3 cast alloy was cleaned in a mild alkine cleaner, rinsed with deionized water and dried.

This alloy was purchased from Bryan Die Cast Products, Inc. of Bryan, Ohio. This alloy contains by weight 3.5 to 4.3% Al, 0.02–0.05% Mg, max of 0.25% Cu, 0.10% Fe, trace amounts of Pb, Cd and Sn, and the balance being Zn, i.e., 95.2–96%.

The cleaned cast Zn—al alloy panel was then immersed in the following water based emulsion:

2.5% Dipropylene glycol;
 2.2% trimellitic anhydride;
 2.5% of Natralube 210,
 0.56% 2-Amino-2-Methyl-1-propanol (emulsification agent); and
 92.24% mixture of water and enough ammonia to reach a pH of 9.0–9.5.

After approximately 1 minute the panel was removed from the emulsion and allowed to dry at room temperature for about 10 minutes. The dried coated panel was then placed in a heat chamber which was at a temperature of 275–300° F. The panel remained in the heat chamber for about 15 minutes. The panel was removed and had thereon a thin lanolin wax polyester coating. The lanolin wax polyester coated panel was allowed to cool. The cooled panel was then placed in a salt fog at 95° F. according to ASTM method B-117. After 336 hours of exposure to this salt fog, the panel showed no signs of corrosion.

I claim:

1. An aqueous aluminum coating composition to provide an outer protective coating for an anodized or non-anodized aluminum or aluminum alloy which may also have an intermediate conversion coating comprising the compounds of a polybasic acid or anhydride, a polyol, and an effective amount of a lanolin wax acid to form a wax polyester in situ coating from said polybasic acid or anhydride, polyol, and lanolin wax acid and which effective amount of lanolin wax acid will provide a coating which will provide corrosion resistance to said anodized or non-anodized aluminum or aluminum alloy such that, when subjected to a salt fog at 95° F. for at least 100 hrs., the aluminum or aluminum alloy will show no signs of corrosion.

2. The composition of claim 1 wherein the wax acid is a lanolin wax acid having an overall acid number of about 100 to about 160 and an overall hydroxyl number of 30–100.

3. The composition of claim 2 wherein the polybasic acid or anhydride is selected from the group consisting of trimellitic acid, isophthalic acid, polyethylene acrylic acid and the anhydrides thereof.

4. The composition of claim 2 wherein the polyol is selected from the group the consisting of dipropylene glycol, 1,4-cyclohexanedimethanol, triethylene glycol, diethylene glycol and hydrogenated bisphenol.

5. The composition of claim 2 wherein the polybasic acid or anhydride is selected from the group consisting of trimellitic acid, trimellitic anhydride and isophthalic acid and mixtures thereof; and the polyol is selected from the group consisting of dipropylene glycol, 1,4-cyclohexanedimethanol and mixtures thereof.

6. The composition of claim 3 wherein the polyol is selected from the group consisting of dipropylene glycol, 1,4-cyclohexanedimethanol and mixtures thereof.

7. An anodized or non-anodized aluminum or aluminum alloy article comprising said article having thereon a wax acid polyester protective coating formed by the in-situ reaction of a polybasic acid or anhydride, a polyol and an effective amount of a lanolin wax acid and which effective amount of lanolin wax acid provides said protective coating, such that, when subjected to a salt fog at 95° F. for at least 100 hrs., the article will show no signs of corrosion.

8. The article of claim 7 wherein the wax acid polyester protective coating is formed by the reaction of:

0.5 to 20 parts by weight polybasic acid or anhydride, 0.5 to 3.0 parts by weight polyol, and 0.1 to 3.0 parts by weight lanolin wax acid having an overall acid number of 100–160.

9. The article of claim 8 wherein the lanolin wax acid has an overall acid number of 125–150 and an overall hydroxyl number of 40–60.

10. The article of claim 8 wherein the polybasic acid or anhydride is selected from the group consisting of trimellitic acid, isophthalic acid, polyethylene acrylic acid and the anhydrides thereof.

11. The article of claim 10 wherein the polyol is selected from the group consisting of dipropylene glycol; 1,4-cyclohexanedimethanol, triethylene glycol, diethylene glycol, and hydrogenated bisphenol.

12. The article of claim 10 wherein the polyol is selected from the group consisting of dipropylene glycol, 1,4-cyclohexanedimethanol and mixtures thereof.

13. The article of claim 12 further comprising an intermediate conversion coating which is selected from the group consisting of permanganate and zirconium conversion coating.

14. The article of claim 12 wherein the article is an aluminum alloy article having at least 3% by weight of aluminum and when subjected to a salt fog at 95° F. for at least 100 hrs showing no signs of corrosion.

15. The article of claim 14 wherein the aluminum alloy article has at least 80% by weight Al.

16. The article of claim 14 wherein the aluminum alloy article has 3–7% by weight Al and 93–97% Zn.

17. The composition of claim 2 wherein the lanolin wax acid polyester protective coating is formed by the reaction of:

0.5 to 20 parts by weight polybasic acid or anhydride, 0.5 to 3.0 parts by weight polyol, and 0.1 to 3.0 parts by weight lanolin wax acid.

18. The composition of claim 17 wherein the lanolin wax acid has an overall acid number of 125–150 and an overall hydroxyl number of 40–60.

19. The composition of claim 18 wherein the polybasic acid or anhydride is selected from the group consisting of trimellitic acid, trimellitic anhydride and isophthalic acid and mixtures thereof; and the polyol is selected from the group consisting of dipropylene glycol, 1,4-cyclohexanedimethanol and mixtures thereof.

* * * * *